(12) United States Patent
Ericson (10) Patent No.: US 11,816,154 B2
(45) Date of Patent: Nov. 14, 2023

(54) METHODS AND SYSTEMS FOR GENERATING A UNIFIED METADATA MODEL

(71) Applicant: EMC IP Holding Company LLC, Hopkinton, MA (US)

(72) Inventor: George Magruder Ericson, Shrewsbury, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 17/507,470

(22) Filed: Oct. 21, 2021

(65) Prior Publication Data

US 2023/0130565 A1 Apr. 27, 2023

(51) Int. Cl.
| | |
|---|---|
| *G06F 16/80* | (2019.01) |
| *G06F 16/90* | (2019.01) |
| *G06F 16/84* | (2019.01) |
| *G06F 16/901* | (2019.01) |
| *G06F 16/906* | (2019.01) |

(52) U.S. Cl.
CPC ............ *G06F 16/84* (2019.01); *G06F 16/906* (2019.01); *G06F 16/9017* (2019.01)

(58) Field of Classification Search
CPC ..... G06F 16/84; G06F 16/9017; G06F 16/906
See application file for complete search history.

(56) References Cited

U.S. PATENT DOCUMENTS

2003/0120651 A1* 6/2003 Bernstein .............. G06F 16/258
2017/0220698 A1* 8/2017 Dietrich .............. G06F 16/9024

OTHER PUBLICATIONS

"Australian Government Recordkeeping Metadata Standard ", National Archives of Australia, Commonwealth of Australia, Jun. 15, 2015 (126 pages).
ODRL Information Model 2.2, W3C Recommendation, Feb. 15, 2018, found online at https://www.w3.org/TR/odrl- model/, (63 pages).
PROV-DM: The PROV Data Model, W3C Recommendation, Apr. 30, 2013, found online at https://www.w3.org/TR/2013/REC-prov-dm-20130430/, (44 pages).

* cited by examiner

*Primary Examiner* — Kristopher Andersen
(74) *Attorney, Agent, or Firm* — Chamberlain, Hrdlicka, White, Williams, & Aughtry (57) ABSTRACT

Systems and methods for generating a unified metadata model, that includes selecting a first source metadata model, copying a first class, from the first source metadata model, to a first modified metadata model using a unified metadata mapping, and after copying the first class, selecting a second source metadata model, copying a second class, from the second source metadata model, to a second modified metadata model using the unified metadata mapping, and creating the unified metadata model using the first modified metadata model and the second modified metadata model.

14 Claims, 8 Drawing Sheets

METHODS AND SYSTEMS FOR GENERATING A UNIFIED METADATA MODEL

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a method for generating a unified metadata model, that includes selecting a first source metadata model, copying a first class, from the first source metadata model, to a first modified metadata model using a unified metadata mapping, and after copying the first class, selecting a second source metadata model, copying a second class, from the second source metadata model, to a second modified metadata model using the unified metadata mapping, and creating the unified metadata model using the first modified metadata model and the second modified metadata model.

In general, in one aspect, embodiments relate to a non-transitory computer readable medium that includes instructions which, when executed by a computer processor, enables the computer processor to perform a method for generating a unified metadata model, that includes selecting a first source metadata model, copying a first class, from the first source metadata model, to a first modified metadata model using a unified metadata mapping, and after copying the first class, selecting a second source metadata model, copying a second class, from the second source metadata model, to a second modified metadata model using the unified metadata mapping, and creating the unified metadata model using the first modified metadata model and the second modified metadata model.

In general, in one aspect, embodiments relate to a computing device, that includes memory, and a processor, where the processor is configured to perform a method for generating a unified metadata model, that includes selecting a first source metadata model, copying a first class, from the first source metadata model, to a first modified metadata model using a unified metadata mapping, and after copying the first class, selecting a second source metadata model, copying a second class, from the second source metadata model, to a second modified metadata model using the unified metadata mapping, and creating the unified metadata model using the first modified metadata model and the second modified metadata model.

Other aspects will be apparent from the following description and the appended claims.

DETAILED DESCRIPTION

In general, embodiments relate to systems and methods for generating a unified metadata model given one or more source metadata models. Multiple source metadata models for describing a particular file may result in redundant data existing in two or more locations, and unique data existing in only one location—where that one location does not comprehensively include all unique data. Accordingly, a unified metadata model may be constructed that can accept all unique data from multiple (two or more) source metadata models while eliminating redundant data and organizing related metadata into an efficient hierarchy of classes and properties. Further, a single source metadata model may be converted to a unified metadata model to provide a consistent format and to allow for future additions of classes and properties not native to the format of the one source metadata model.

Specific embodiments will now be described with reference to the accompanying figures. In the following description, numerous details are set forth as examples. One of ordinary skill in the art, having the benefit of this detailed description, would appreciate that one or more embodiments of the present invention may be practiced without these specific details and that numerous variations or modifications may be possible without departing from the scope of the embodiments disclosed herein. Certain details, known to those of ordinary skill in the art, may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

Figure 1:
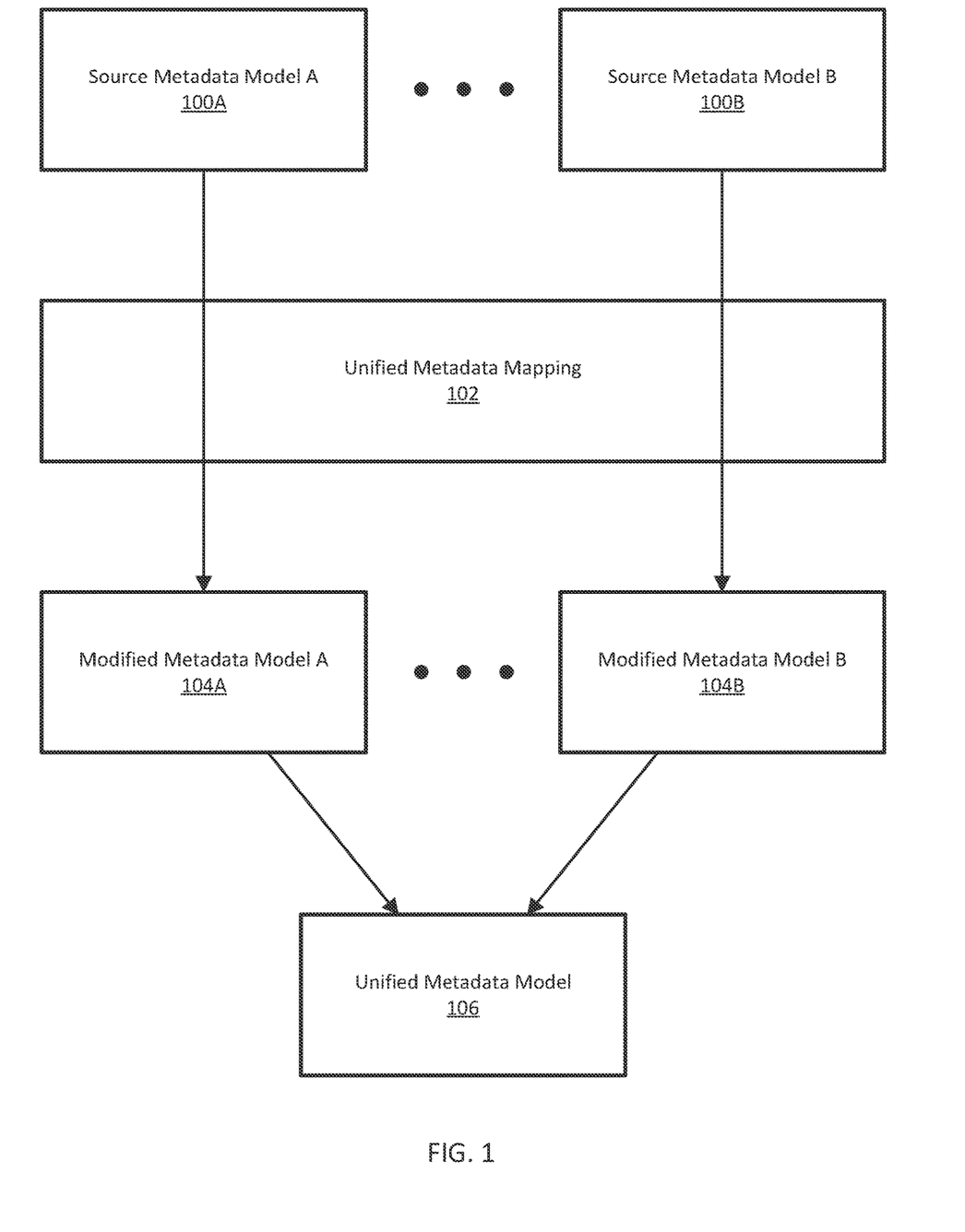
FIG. 1 shows a diagram of the relationship between metadata models, in accordance with one or more embodiments.

FIG. 1 shows a diagram of the relationship between metadata models, in accordance with one or more embodiments. One or more source metadata model(s) (e.g., source metadata model A (100A), source metadata model B (100B)) may be used to generate one or more modified metadata model(s) (e.g., modified metadata model A (104A), modified metadata model B (104B)) using a unified metadata mapping (e.g., unified metadata mapping (102)). Further, one or more modified metadata model(s) (e.g., 104A, 104B) may be used to generate a unified metadata model (e.g., unified metadata model (106)). Each of these components is described below. One or all of the components described in FIG. 1 may be stored, read, modified, and/or executed on a computing device (described in the discussion of FIG. 8).

In one or more embodiments, a source metadata model (e.g., source metadata model A (100A), source metadata model B (100B)) is a metadata model. A source metadata model (100A, 100B) may include data (e.g., properties, information, etc.) describing other data (e.g., files). Additional details regarding a metadata model, generally, may be found in the description of FIG. 2.

In one or more embodiments, a unified metadata mapping (e.g., unified metadata mapping (102)) includes a series of mapping entries (not shown) that map (e.g., associate) one or more classes and properties of a source metadata model (100A, 100B) to one or more classes and properties of a modified metadata model (104A, 104B) and/or a unified metadata model (106). Additional details regarding a unified metadata mapping may be found in the description of FIG. 3.

In one or more embodiments, a modified metadata model (e.g., modified metadata model A (104A), modified metadata model B (104B)) is a metadata model. A modified metadata model (104A, 104B) may include all of the data (i.e., classes and properties) of a single source metadata model (100A, 100B) but be organized into a format similar to a unified metadata model (106). As a non-limiting example, a modified metadata model (104A, 104B) may be in a unified modeling language (UML) format whereas a source metadata model (100A, 100B) may be in a proprietary format. Additional details regarding a metadata model, generally, may be found in the description of FIG. 2.

In one or more embodiments, a unified metadata model (e.g., unified metadata model A (106)) is a metadata model. A unified metadata model (106) may include all of the data (i.e., classes and properties) of one or more source metadata models (100A, 100B). Similar to the modified metadata model (104A, 104B), a unified metadata model (106) may be in a UML format. Additional details regarding a metadata model, generally, may be found in the description of FIG. 2.

While FIG. 1 shows a specific configuration of a system, other configurations may be used without departing from the scope of the embodiments disclosed herein. Accordingly, embodiments disclosed herein should not be limited to the configuration of devices and/or components shown in FIG. 1.

Figure 2:
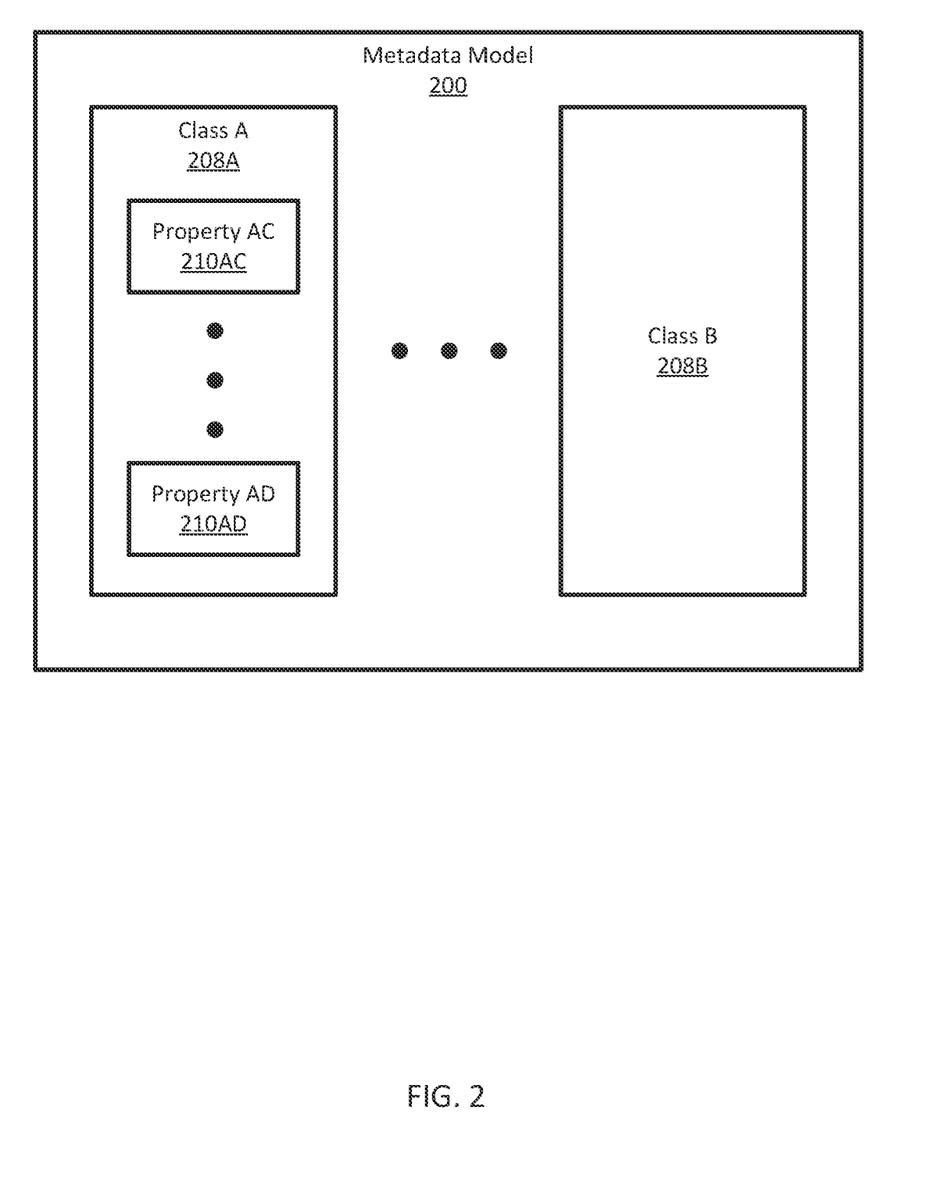
FIG. 2 shows a diagram of metadata model, in accordance with one or more embodiments.

FIG. 2 shows a diagram of metadata model, in accordance with one or more embodiments. The metadata model (e.g., metadata model (200)) may include one or more class(es) (e.g., class A (208A), class B (208B)) which may include one or more properties (e.g., property AC (210AC), property AD (210AD)). Each of these components is described below. One or all of the components described in FIG. 2 may be stored, read, modified, and/or executed on a computing device (described in the discussion of FIG. 8).

In one or more embodiments, a metadata model (e.g., metadata model (200)) is a data structure that includes data (e.g., classes (208A, 208B), properties (210AC, 210AD), information, etc.) describing other data (e.g., files). A single metadata model may include information describing one file, or may include information describing two or more files that share metadata. A metadata model (200) may be organized into categories of classes (208A, 208B) that group similar properties (210AC, 210AD).

In one or more embodiments, a class (e.g., class A (208A), class B (208B)) is collection of one or more properties (210A, 210B) that are organized into the class (208A, 208B) based on similarities between those properties (210A, 210B). As a non-limiting example, there may be a "Rule" class (e.g., 208A, 208B) for a certain file, that "Rule" class may include properties (210A, 210B), where each property relates to different types of "rules" related to the specific file(s) described by the metadata model (200). In one or more embodiments, multiple levels of classes (208A, 208B) may exist within a metadata model (200). As a non-limiting example, a top-level class (208A, 208B) may relate to license types, and sub-classes within that top-level class may be specific to different regions. That is, continuing with the example, there may be a sub-class for licensing restrictions in the United States and a second sub-class for licensing restrictions in Europe.

In one or more embodiments, a property (e.g., property AC (210AC), property AD (210AD)) is data describing a specific feature of the file(s) described by the metadata model (200). As non-limiting examples, a property (210AC, 210AD) may be the file name (e.g., "JPE.txt"), file creation date (e.g., "1992-12-04"), file size (e.g., 128 kb), privileges (e.g., "wrx"), etc. As another set of non-limiting examples, the metadata model (200), generally, may relate to the "provenance" of the file, and the properties (210AC, 210AD) may be the author (e.g., "John Doe"), license type (e.g., "all rights reserved", "open source", etc.), allowed region(s) (e.g., "USA"), etc.

While FIG. 2 shows a specific configuration of a system, other configurations may be used without departing from the scope of the embodiments disclosed herein. Accordingly, embodiments disclosed herein should not be limited to the configuration of devices and/or components shown in FIG. 2.

Figure 3:
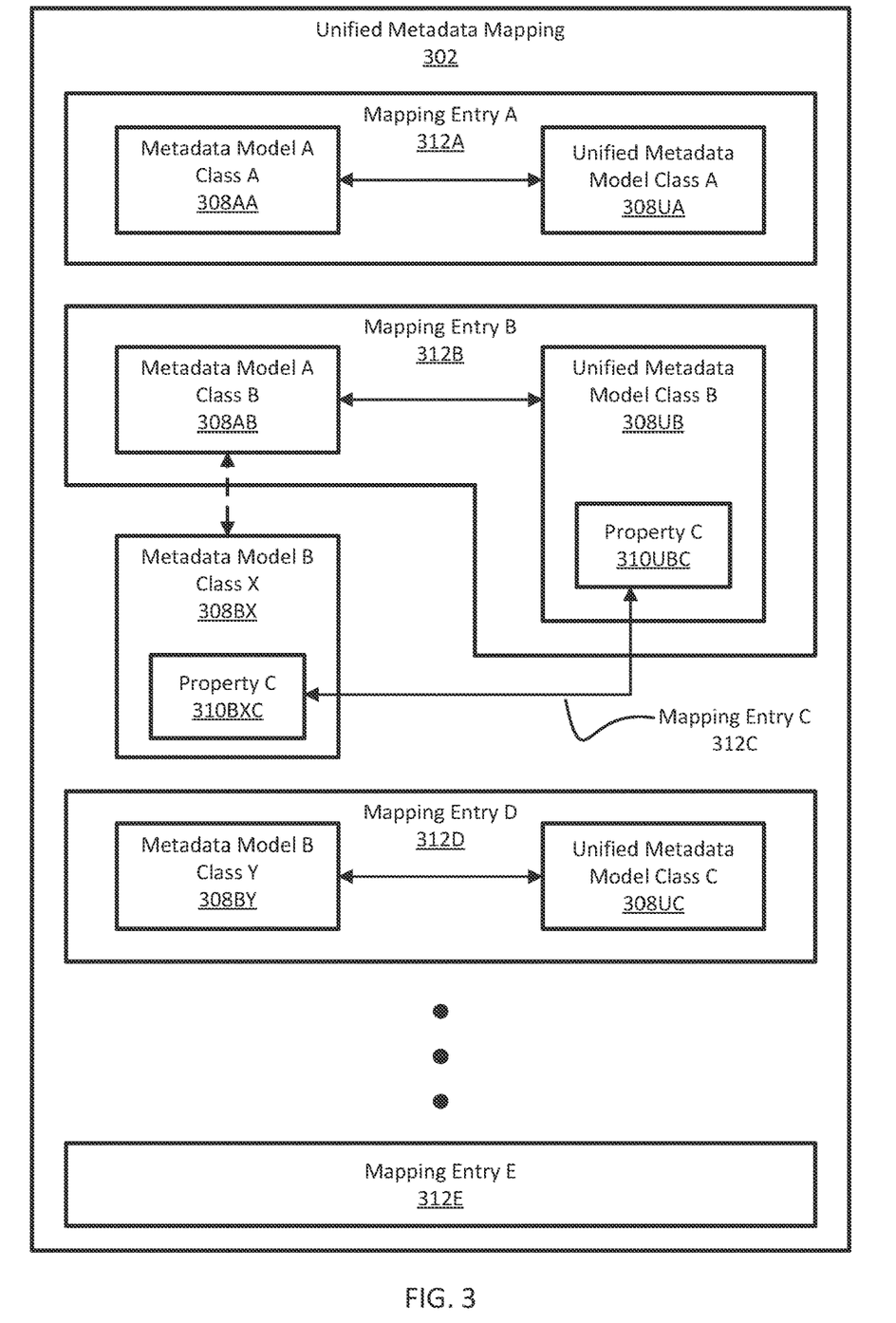
FIG. 3 shows a diagram of unified metadata mapping, in accordance with one or more embodiments.

FIG. 3 shows a diagram of unified metadata mapping, in accordance with one or more embodiments. The unified metadata mapping (e.g., unified metadata mapping (302)) may include one or more mapping entries (e.g., mapping entry A (312A), mapping entry B (312B), mapping entry C (312C), mapping entry D (312D), mapping entry E (312E)). Each of these components is described below. One or all of the components described in FIG. 3 may be stored, read, modified, and/or executed on a computing device (described in the discussion of FIG. 8).

In one or more embodiments, a unified metadata mapping (e.g., unified metadata mapping (302)) includes a series of mapping entries (312A-312D). The unified metadata mapping (302) may be used to reorganize a source metadata model into a modified metadata model and/or unified metadata model (e.g., see FIG. 1).

In one or more embodiments, a mapping entry (e.g., mapping entry A (312A), mapping entry B (312B), mapping entry C (312C), mapping entry D (312D), mapping entry E (312E)) is a single item in the unified metadata mapping (302) that maps (e.g., associates) a source metadata model class ("source class", 308AA, 308AB, 308BY) or property ("source property", 310BXC) to a unified metadata model class ("unified class", 308UA-308UC) or property ("unified property", 310UBC), respectively.

For example, as shown in mapping entry A (312A), metadata model A class A (308AA) is mapped to unified metadata model class A (308UA). Accordingly, the entire contents of metadata model A class A (308AA) correspond to the unified metadata model class A (308UA) however, the inverse is not necessarily true. As an example, unified metadata model class B (308UB) includes all of the properties from metadata model A class B (308AB) and property C (310BXC) from metadata model B class X (308BX). Unified metadata model class B (308UB) may include properties from multiple source metadata model classes due to an association between those source classes (i.e., like that of 308AB and 308BX) causing the properties of each class to merge into a single unified class (308UB) of the unified metadata model, but excluding duplicate properties (not shown) found in source metadata model B class X (308BX).

While FIG. 3 shows a specific configuration of a system, other configurations may be used without departing from the scope of the embodiments disclosed herein. Accordingly, embodiments disclosed herein should not be limited to the configuration of devices and/or components shown in FIG. 3.

Figure 4:
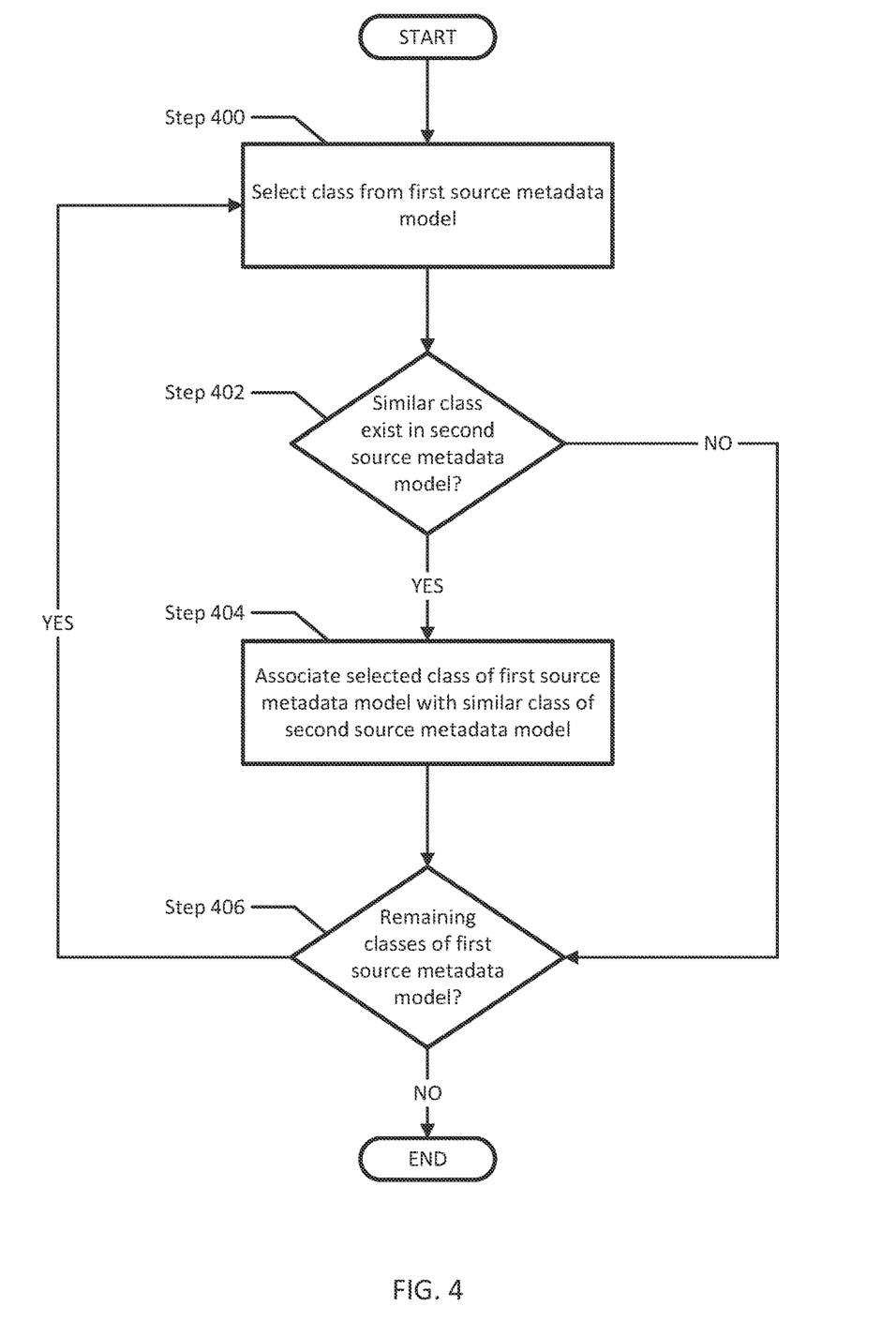
FIG. 4 shows a flowchart of a method of associating similar metadata classes, in accordance with one or more embodiments.

FIG. 4 shows a flowchart of a method of associating similar metadata classes, in accordance with one or more embodiments. All or a portion of the method shown in FIG. 4 may be performed by one or more components of a computing device and/or a user thereof. However, another component of the system may perform this method without departing from the scope of the embodiments disclosed herein. While the various steps in this flowchart are presented and described sequentially, one of ordinary skill in the relevant art will appreciate that some or all of the steps may be executed in different orders, may be combined or omitted, and some or all steps may be executed in parallel.

In Step 400, a class from a first source metadata model is selected. The selected class is chosen from any previously unselected classes in the first source metadata model. The classes may be selected in any appropriate order (e.g., alphabetical, size, existing order, etc.).

In Step 402, a determination is made as to whether a similar class exists in a second source metadata model. A class, in the second source metadata model, may be similar to the class selected from the first source metadata model, if the classes are similarly named, include similar or same properties (e.g., describe related attributes), and/or are otherwise related.

If a class in the second source metadata model exists that is similar to the class selected from the first source metadata model (402-YES), then the method proceeds to Step 404. However, if no class in the second source metadata model exists that is similar to the class selected from the first source metadata model (402-NO), then the method proceeds to Step 406.

In Step 404, when a class in the second source metadata model is found to be similar to the class selected from the first source metadata model, the two classes are associated with each other. The classes may be associated by generating a data structure that maps the relationship between classes of the first and second source metadata models (e.g., an association list).

In Step 406, a determination is made as to whether there are any classes of the first source metadata model have yet to be selected. If a class in the first metadata model exists that has yet to be selected (406-YES), then the method returns back to Step 400. However, if all classes in the first source metadata model have been selected previously (406-NO), then the method may end.

Despite the use of "first" and "second" used in the discussion of FIG. 4, the method of FIG. 4 may be repeated for any number of source metadata models. In the context of FIG. 4, the adjectives "first" and "second" should only be interpreted to provide distinction between two source metadata models.

Figure 5:
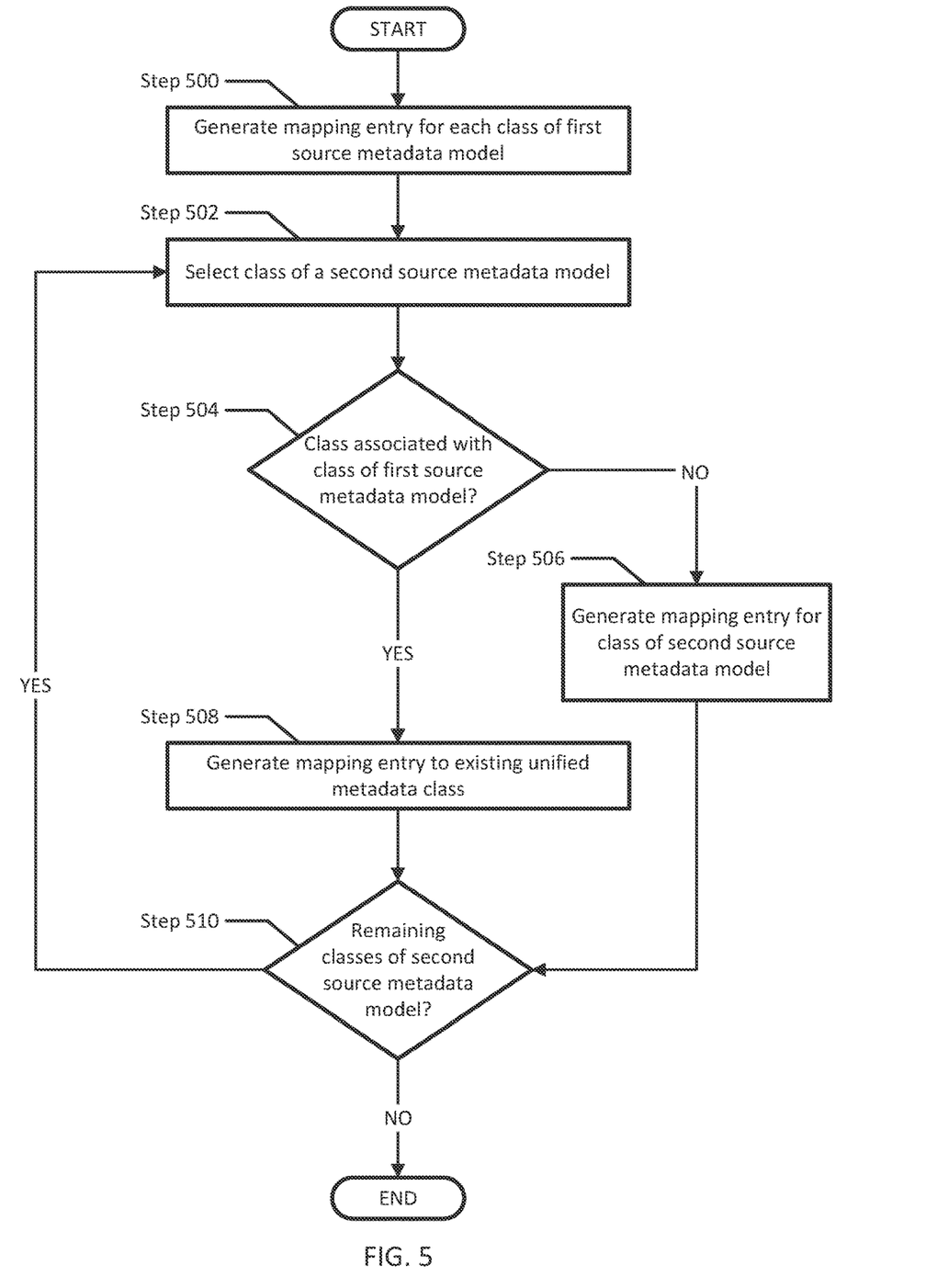
FIG. 5 shows a flowchart of a method of generating a unified metadata mapping, in accordance with one or more embodiments.

FIG. 5 shows a flowchart of a method of generating a unified metadata mapping, in accordance with one or more embodiments. All or a portion of the method shown in FIG. 5 may be performed by one or more components of a computing device and/or a user thereof. However, another component of the system may perform this method without departing from the scope of the embodiments disclosed herein. While the various steps in this flowchart are presented and described sequentially, one of ordinary skill in the relevant art will appreciate that some or all of the steps may be executed in different orders, may be combined or omitted, and some or all steps may be executed in parallel.

In Step 500, a mapping entry is generated, in the unified metadata mapping, for every class in a first source metadata model. That is, each class in a first source metadata model is mapped to a corresponding class is in the unified metadata model. The corresponding classes in the unified metadata model may borrow the names of the classes provided by the first source metadata model, or the classes in the unified metadata model may be assigned custom names that describe the properties included therein.

In Step 502, a class from a second source metadata model is selected. The selected class is chosen from any previously unselected classes in the second source metadata model. The classes may be selected in any appropriate order (e.g., alphabetical, size, existing order, etc.).

In Step 504, a determination is made as to whether the class selected from the second source metadata model is associated with a class of the first source metadata model. To make this determination, a lookup may be performed in the data structure (described in Step 404) that provides the association between classes of different source metadata models.

If the class selected from the second source metadata model is associated with a class from the first source metadata model (504-YES), the method proceeds to Step 508. However, if the class selected from the second source metadata model is not associated with a class from the first source metadata model (504-NO), the method proceeds to Step 506.

In Step 506, if no association is found between the selected class of the second source metadata model, a mapping entry is generated, in the unified metadata mapping, for the selected class in a second source metadata model. That is, the selected class in the second source metadata model is mapped to a corresponding class is in the unified metadata model. The corresponding class in the unified metadata model may borrow the names of the classes provided by the second source metadata model, or the classes in the unified metadata model may be assigned custom names that describe the properties included therein.

In Step 508, if an association is found between the selected class of the second source metadata model, one or more mapping entries are generated, in the unified metadata mapping, for the unique properties of the selected class of the second source metadata model. In one or more embodiments, one or more properties of the selected class is mapped to one or more properties in an existing class of the unified metadata model (the unified metadata model class that is mapped to the first source metadata model associated with the selected class of the second source metadata model). The properties of the selected class (of the second source metadata model) that are mapped to the unified metadata model class may be chosen based on the information included within the properties. As a non-limiting example, the mapped properties may include information that is absent from the class of the first source metadata model associated with the selected class (of the second source metadata model)—thereby only including unique properties and excluding duplicative properties.

In Step 510, a determination is made as to whether there are any classes of the second source metadata model that have yet to be selected. If a class in the second source metadata model exists that has yet to be selected (510-YES), then the method returns back to Step 502. However, if all classes in the second source metadata model have been selected previously (510-NO), then the method may end.

Despite the use of "first" and "second" used in the discussion of FIG. 5, the method of FIG. 5 may be repeated for any number of source metadata models. In the context of FIG. 5, the adjectives "first" and "second" should only be interpreted to provide distinction between two source metadata models.

Figure 6:
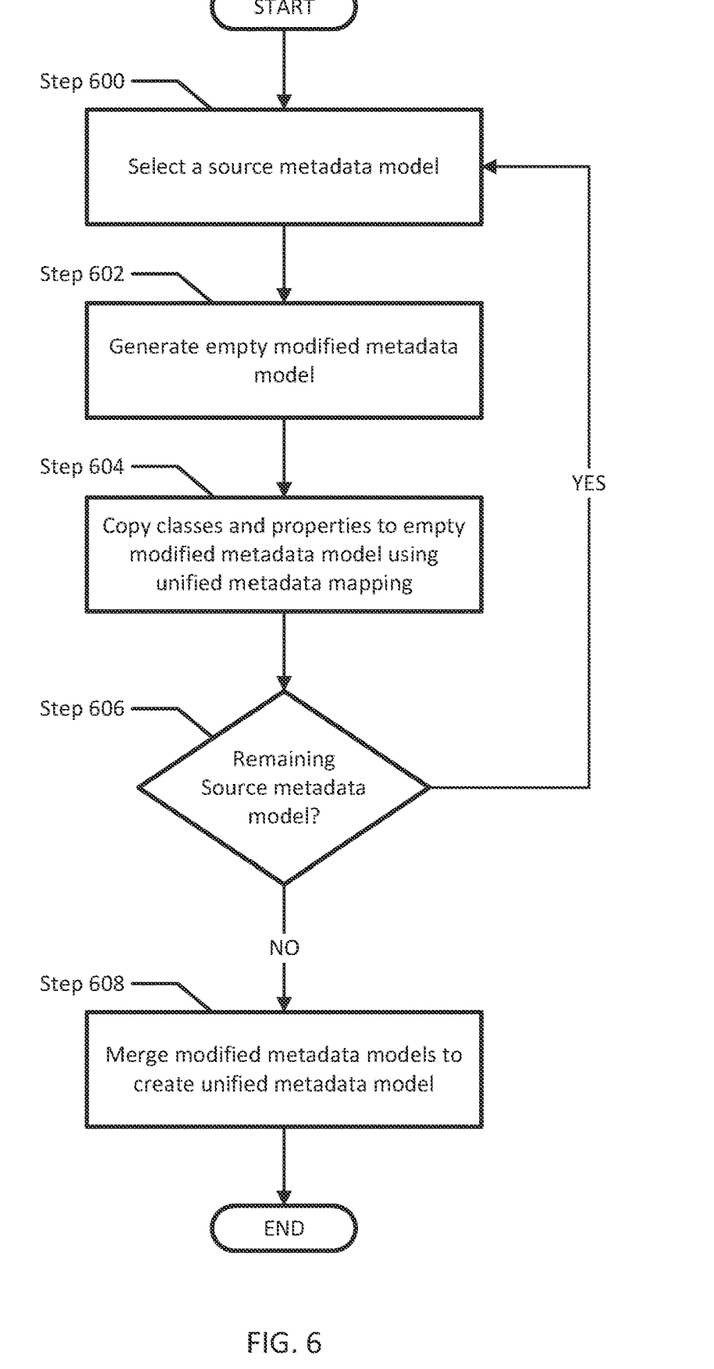
FIG. 6 shows a flowchart of a method of generating a unified metadata model, in accordance with one or more embodiments.

FIG. 6 shows a flowchart of a method of generating a unified metadata model, in accordance with one or more embodiments. All or a portion of the method shown in FIG. 6 may be performed by one or more components of a computing device and/or a user thereof. However, another component of the system may perform this method without departing from the scope of the embodiments disclosed herein. While the various steps in this flowchart are presented and described sequentially, one of ordinary skill in the relevant art will appreciate that some or all of the steps may be executed in different orders, may be combined or omitted, and some or all steps may be executed in parallel.

In Step 600, a source metadata model is selected. The selected source metadata model is chosen from any previously unselected source metadata models. The source metadata model may be selected in any appropriate order (e.g., alphabetical, size, existing order, etc.).

In Step 602, a unique and empty modified metadata model (e.g., a template) is generated for the selected source metadata model. The empty modified metadata model may be created by allocating space (e.g., memory, storage, etc.) of sufficient size to hold the data of, at least, the selected source metadata model.

In Step 604, the classes (or certain properties thereof) are copied to the empty modified metadata model using the unified metadata mapping. That is, in one or more embodiments, a lookup is performed for each class (of the selected source metadata model) in the unified metadata mapping. If the entire class is mapped to a class in the unified metadata class, the entire class is copied to the respective location in the modified metadata model (and renamed if required). However, if the entire class is not mapped to class of the unified metadata model, but only one or more properties are mapped to one or more properties in the unified metadata model, then only those properties are copied to the modified metadata model. In such cases where only certain properties of the source metadata model class are mapped, the respective unified class is still created, but only those mapped source properties are copied to the respective unified class.

In Step 606, a determination is made as to whether there are any source metadata models that have yet to be selected. If a source metadata model exists that has yet to be selected (606-YES), then the method returns back to Step 600. However, if all source metadata models have been selected previously (606-NO), then the method may end.

In Step 608, each of the modified metadata models are merged to create a unified metadata model. The modified metadata models may be merged by generating a single empty unified metadata model then copying the contents of each modified metadata model into the empty unified data metadata model. Additionally, a unified metadata model may be created from a selected modified metadata model, where every other modified metadata model is copied into that selected modified metadata model.

Figure 7:
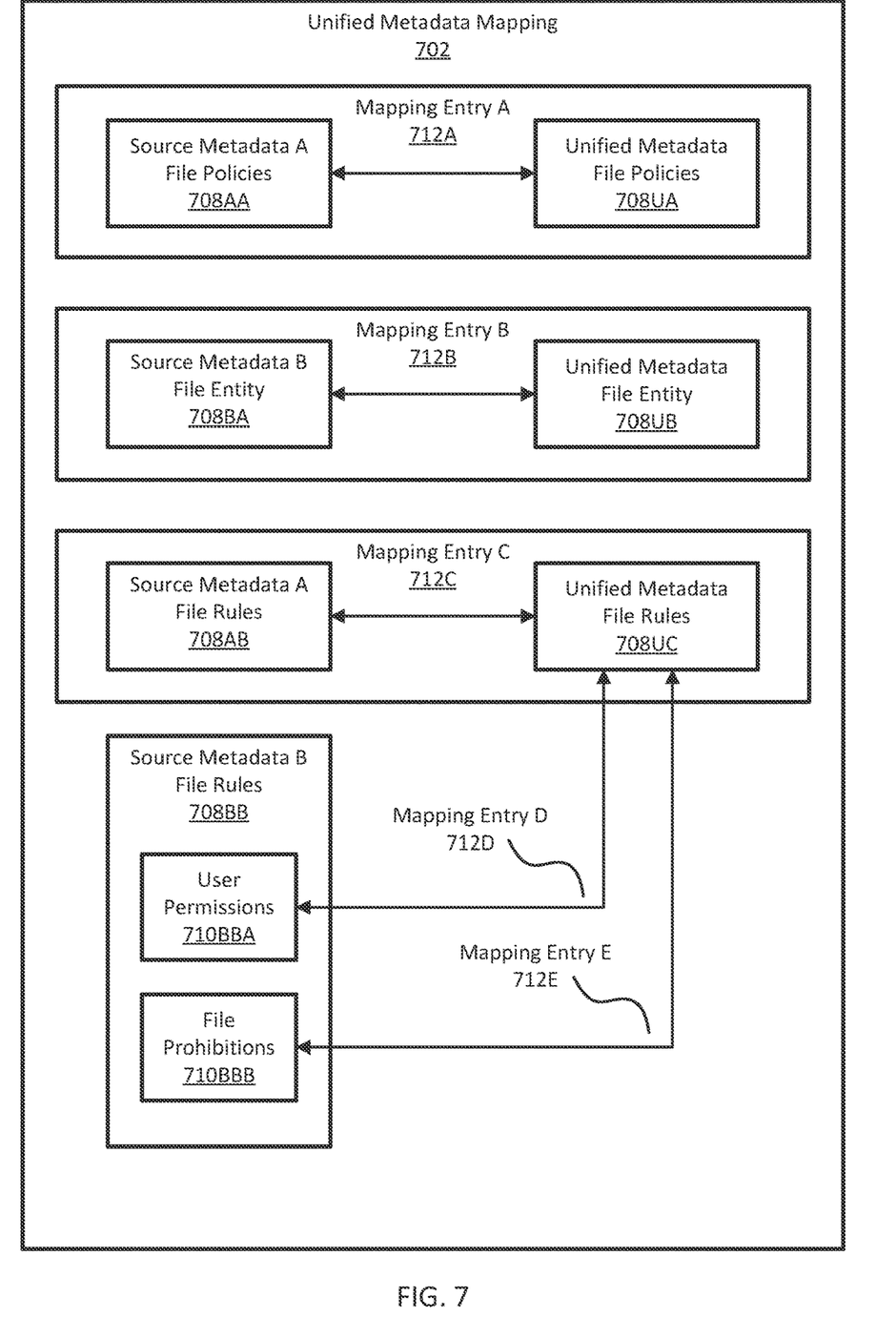
FIG. 7 shows an example of a unified metadata mapping, in accordance with one or more embodiments.

FIG. 7 shows an example of a unified metadata mapping, in accordance with one or more embodiments. The following use case is for explanatory purposes only and not intended to limit the scope to this embodiment.

Consider a scenario in which source metadata A (a source metadata model) includes a "file policies" class (708AA) that is mapped (mapping entry A (712A)) to a unified metadata "file policies" class (708UA). In such a case, all of the properties (not shown) of metadata A file policies (708AA) would be mapped to all of the properties (not shown) of the unified metadata file policies (708UA).

Similarly, source metadata B (a different source metadata model than source metadata A) includes a "file entity" class (708BA) that is mapped (mapping entry B (712B)) to a unified metadata "file entity" class (708UB). In such a case, all of the properties (not shown) of metadata B file entity (708BA) would be mapped to all of the properties (not shown) of the unified metadata file entity (708UB).

Further, source metadata A and source metadata B each include a "file rules" class (708AB, 708BB, respectively). However, only the metadata A file rules class (708AB) is mapped (mapping entry C (712C)) to a unified metadata "file rules" class (708UC). Further, the source metadata B "file rules" class (708BB) includes properties "user permissions" (710BBA) and "file prohibitions" (710BBB) that are exclusive properties absent in the metadata A file rules class (708AB). Accordingly, "user permissions" (710BBA) is mapped (mapping entry D (712D)) to an equivalent property of the unified metadata "file rules" class (708UC), and "file prohibitions" (710BBB) is mapped (mapping entry E (712E)) to an equivalent property of the unified metadata "file rules" class (708UC).

Figure 8:
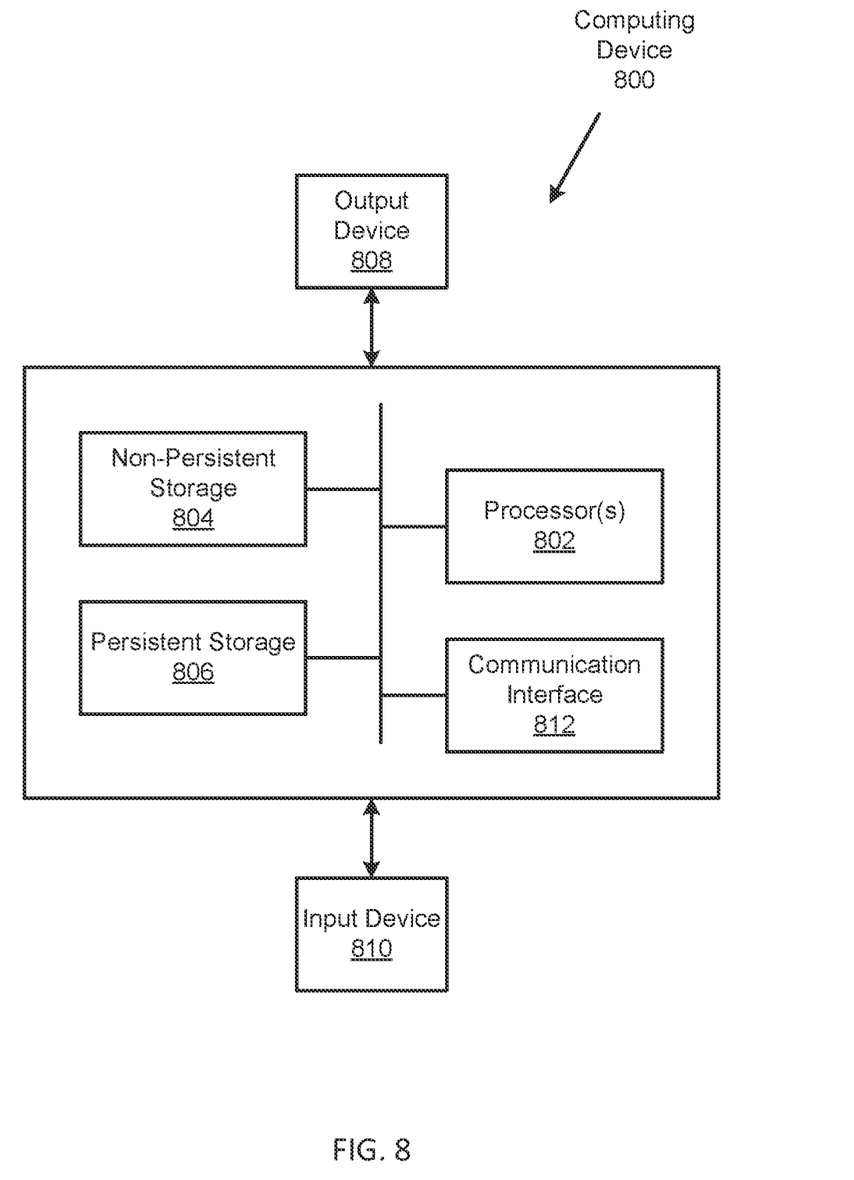
FIG. 8 shows a diagram of a computing device, in accordance with one or more embodiments.

FIG. 8 shows a diagram of a computing device, in accordance with one or more embodiments. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

While systems and methods have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for generating a unified metadata model, performed using a computing device comprising a memory and a processor, wherein the method comprises:
    selecting a first source metadata model;
    copying a first class, from the first source metadata model, to a first modified metadata model using a unified metadata mapping;
    after copying the first class:
        selecting a second source metadata model;
        copying a second class, from the second source metadata model, to a second modified metadata model using the unified metadata mapping; and
        creating the unified metadata model using the first modified metadata model and the second modified metadata model;
    prior to selecting the first source metadata model, generating the unified metadata mapping, wherein generating the unified metadata mapping comprises:
    generating a first mapping entry, in the unified metadata mapping, that maps the first class to a third class of the unified metadata model; and
    after generating the first mapping entry:
        selecting the second class;
        making a first determination that the second class is associated with the first class; and
        based on the first determination:
            making a second determination that a second source property of a second plurality of properties of the second class is duplicative of a first source property of a first plurality of properties of the first class;
            making a third determination that a third source property of the second plurality of properties of the second class is not duplicative of any of the first plurality of properties of the first class; and
            generating, based on the third determination, a second mapping entry, in the unified metadata mapping, that maps the third source property to a unified property in the third class of the unified metadata model.

2. The method of claim 1, wherein creating the unified metadata model comprises:
    merging the first modified metadata model with the second modified metadata model.

3. The method of claim 2, wherein merging the first modified metadata model with the second modified metadata model comprises:
    copying the first plurality of properties of the first class to the third class of the unified metadata model; and
    copying the third source property to the third class of the unified metadata model.

4. The method of claim 1, wherein making the first determination that the second class is associated with the first class comprises:
    performing a lookup, in an association list, to identify an association between the first class and the second class.

5. The method of claim 4, wherein prior to generating the unified metadata mapping, the method further comprises:
    generating the association list.

6. The method of claim 5, wherein generating the association list comprises:
    selecting, from the first source metadata model, the first class;
    making a fourth determination that the second class of the second source metadata model is similar to the first class; and
    based on the fourth determination:
        storing, in the association list, an entry associating the first class and the second class.

7. A non-transitory computer readable medium comprising instructions which, when executed by a computer processor, enables the computer processor to perform a method for generating a unified metadata model, comprising:
    selecting a first source metadata model;
    copying a first class, from the first source metadata model, to a first modified metadata model using a unified metadata mapping;
    after copying the first class:
        selecting a second source metadata model;
        copying a second class, from the second source metadata model, to a second modified metadata model using the unified metadata mapping; and
        creating the unified metadata model using the first modified metadata model and the second modified metadata model;
    prior to selecting the first source metadata model, generating the unified metadata mapping, wherein generating the unified metadata mapping comprises:
        generating a first mapping entry, in the unified metadata mapping, that maps the first class to a third class; and
        after generating the first mapping entry:
            selecting the second class;
            making a first determination that the second class is associated with the first class; and
            based on the first determination:

making a second determination that a second source property of a second plurality of properties of the second class is duplicative of a first source property of a first plurality of properties of the first class;

making a third determination that a third source property of the second plurality of properties of the second class is not duplicative of any of the first plurality of properties of the first class; and generating, based on the third determination, a second mapping entry, in the unified metadata mapping, that maps the third source property to a unified property in the third class of the unified metadata model.

8. The non-transitory computer readable medium of claim 7, wherein creating the unified metadata model comprises:

merging the first modified metadata model with the second modified metadata model.

9. The non-transitory computer readable medium of claim 8, wherein merging the first modified metadata model with the second modified metadata model comprises:

copying the first plurality of properties of the first class to the third class of the unified metadata model; and copying the third source property to the third class of the unified metadata model.

10. The non-transitory computer readable medium of claim 7, wherein making the first determination that the second class is associated with the first class comprises:

performing a lookup, in an association list, to identify an association between the first class and the second class.

11. The non-transitory computer readable medium of claim 10, wherein prior to generating the unified metadata mapping, the method further comprises:

generating the association list.

12. The non-transitory computer readable medium of claim 11, wherein generating the association list comprises:

selecting, from the first source metadata model, the first class;

making a fourth determination that the second class of the second source metadata model is similar to the first class; and based on the fourth determination:

storing, in the association list, an entry associating the first class and the second class.

13. A computing device, comprising:

memory; and a processor, wherein the processor is configured to perform a method for generating a unified metadata model, comprising:

selecting a first source metadata model;

copying a first class, from the first source metadata model, to a first modified metadata model using a unified metadata mapping;

after copying the first class:

selecting a second source metadata model;

copying a second class, from the second source metadata model, to a second modified metadata model using the unified metadata mapping; and creating the unified metadata model using the first modified metadata model and the second modified metadata model;

prior to selecting the first source metadata model, generating the unified metadata mapping, wherein generating the unified metadata mapping comprises:

generating a first mapping entry, in the unified metadata mapping, that maps the first class to a third class; and after generating the first mapping entry:

selecting the second class;

making a first determination that the second class is associated with the first class; and based on the first determination:

making a second determination that a second source property of a second plurality of properties of the second class is duplicative of a first source property of a first plurality of properties of the first class;

making a third determination that a third source property of the second plurality of properties of the second class is not duplicative of any of the first plurality of properties of the first class; and generating, based on the third determination, a second mapping entry, in the unified metadata mapping, that maps the third source property to a unified property in the third class of the unified metadata model.

14. The computing device of claim 13, wherein creating the unified metadata model comprises: merging the first modified metadata model with the second modified metadata model.

* * * * *